July 31, 1951  R. T. BEASLEY  2,562,762
AUXILIARY WINDMILL DRIVE
Filed May 21, 1946  3 Sheets-Sheet 2
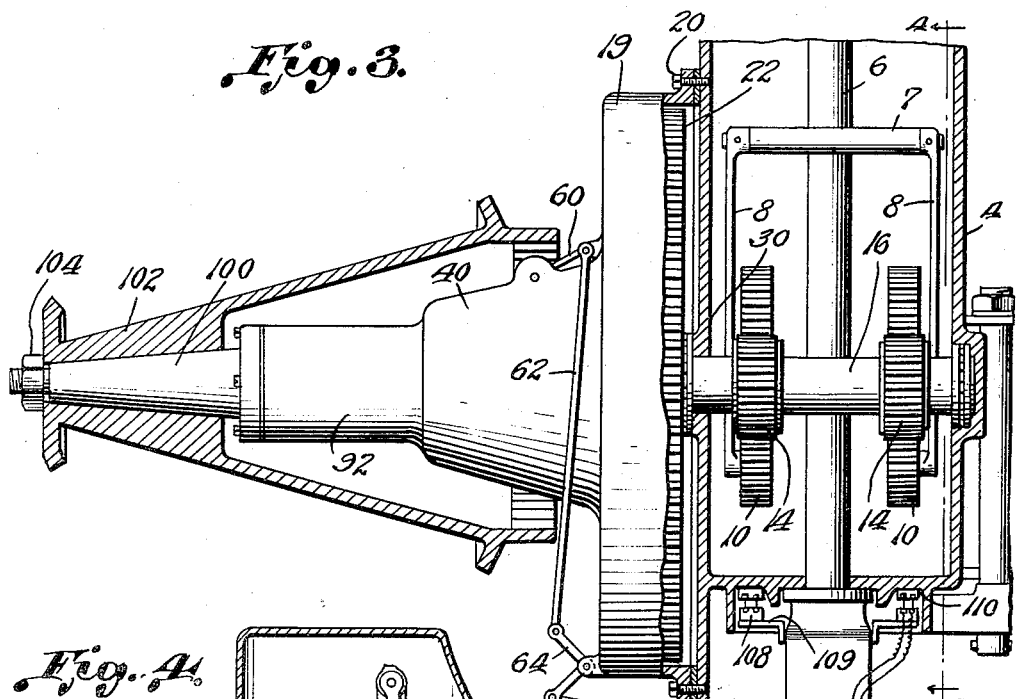
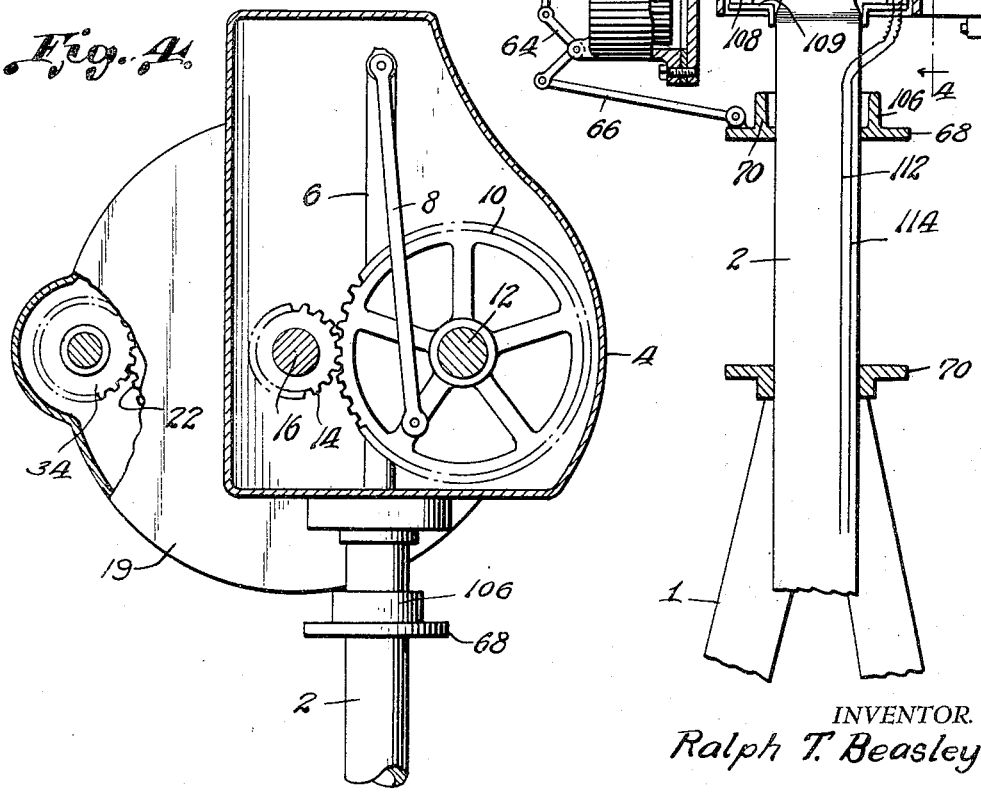
INVENTOR.
Ralph T. Beasley
BY Victor J. Evans & Co.
ATTORNEYS

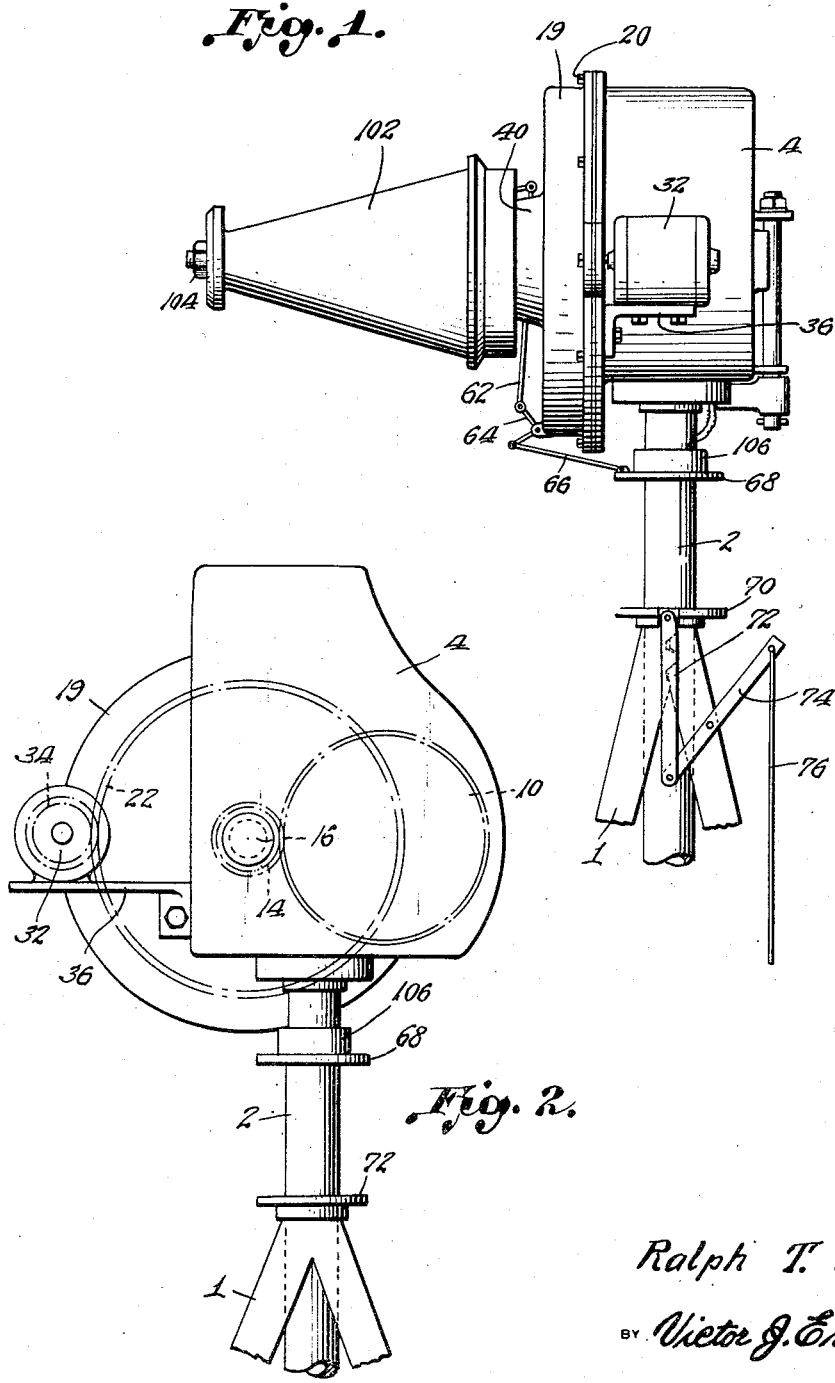

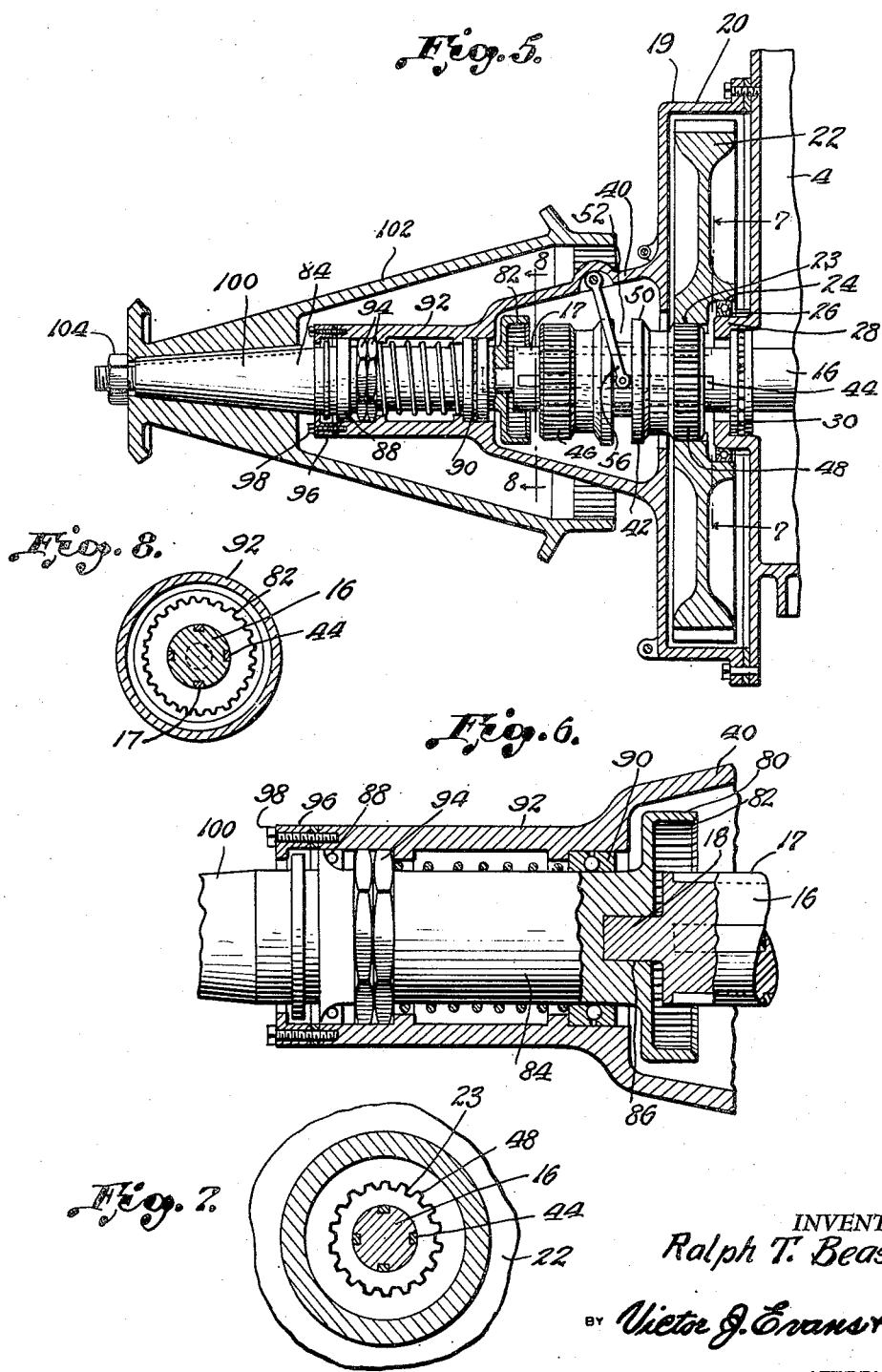

Patented July 31, 1951

2,562,762

UNITED STATES PATENT OFFICE 2,562,762

AUXILIARY WINDMILL DRIVE

Ralph T. Beasley, Victorville, Calif.

Application May 21, 1946, Serial No. 671,226

2 Claims. (Cl. 103—207)

1

My present invention relates to an improved auxiliary windmill drive and more particularly to the transmission embodied therein for alternate use of an electric motor drive when the wind power fails.

Generally my invention comprises the utilization of an electric motor and switch means therefor, for driving the pump jack, and selective clutch means for engaging the motor in power transmitting relation with the main wind driven shaft.

In the accompanying drawings I have illustrated one complete example of the physical embodiment of my invention according to the best mode I have thus far devised but it will be understood that various changes and alterations may be made in the exemplified structure within the scope of the appended claims.

In the drawings:

Figure 1 is a side elevational view of the assembled mechanism.

Figure 2 is a rear elevational view thereof.

Figure 3 is a partial longitudinal sectional view showing the pump jack in detail.

Figure 4 is a vertical transverse sectional view of the pump jack.

Figure 5 is a longitudinal sectional view of the gear shaft and clutch.

Figure 6 is an enlarged detail view of the gear shaft and housing.

Figure 7 is a vertical sectional view taken at line 7—7 of Figure 5.

Figure 8 is a vertical sectional view taken at line 8—8 of Figure 5.

Referring now to the drawings in detail, I have shown a windmill tower 1 and the pump rod casing 2. On the upper end of the pump rod casing I have illustrated the pump jack housing 4. The pump rod 6 is reciprocated in the casing 2 by means of a cross head 7 and connecting rods 8 mounted eccentrically on the driver gear 10 having an axle 12. The small drive gear 14 engages the driver gear, and is mounted upon the drive shaft 16 formed with splines 17 and an extended tongue 18.

Adjacent the pump jack housing 4 I have mounted a housing 19 for the auxiliary drive which includes the driver gear wheel 22 having an internal gear track 23, and formed with an annular groove 24 in which is journaled the ball bearing 26. Between the collar 28 of the housing 4 and the shaft 16 I have placed a ball bearing 30 and these two bearings provide for free running of the shaft 16 within the housing 4 and 19.

An electric motor 32 having a gear 34 engaging the driven wheel 22 provides for the power to

2 shaft 16 when in operating position as will be hereinafter described. The motor 32 is mounted upon a bracket 36 suitably supported upon the housing 4.

A clutch housing 40 is attached to the auxiliary drive housing 22 and within this housing I employ a clutch 42 of hollow cylindrical shape and having inner longitudinal ribs 44 for engagement with the splines 17 of the shaft 16. Splined collars 46 and 48 are placed adjacent the ends of the clutch, and central of the clutch I mount a collar 50 having a peripheral groove 52 to receive the ends of the yoke 56 pivotally supported on the housing 40.

A lever 60 connected with the bell crank 64 through link 62 provides connection with a link 66 attached to a collar 68 slidably mounted on the pump rod casing 2. A lower collar 70 normally rests on the upper extremity of the tower 1 and may be elevated to raise the collar 68 by means of the linkage 72 and lever 74 associated with the pull rod 76 extending to the base of the tower. Pulling on the rod 76 will elevate the lower collar into contact with the upper collar 68 and through the defined linkage the clutch will be moved from right to left in Figure 5.

Referring now to Figures 5 and 6 of the drawings I have illustrated a ring 80 having internal teeth 82 mounted upon the shaft 84 and this shaft is formed with an end groove 86 for engagement with the tongue 18 of the shaft 16 for driving engagement therewith. Bearings 88 and 90 support the shaft within the housing 92 and lock nuts 94 provide for close adjustment of the shaft and housing. A retaining collar 96 is secured in position on the housing 92 by screws 98.

The end of the shaft 84 is tapered as at 100 and upon this tapered end is mounted the spindle 102 for the windmill sails of blades, not shown, and the hub of the windmill would be secured by the nut 104.

When it is desired to drive the pump jack by means of electricity the pull rod 76 is lowered and by means of the above described linkage the clutch teeth 46 are disengaged from the ring 82 and the clutch teeth 48 are engaged with the ring 23. The motion of pulling the rod 76 to raise the collar 70 also closes the circuit to the motor as follows.

An annular ring 106 on the collar 70 engages the contact rings 108 and 110 by movement of ring 109 and the wires 112 and 114 being connected with the connecters of the ring 108 close the circuit to the motor whereupon the motor gear 34 drives the driven wheel 22 and the shaft 16. Thus the pump jack is reciprocated vertically to pump water.

By the use of my invention it will be apparent that wind power will be employed whenever available, but on those days when the air is still and quiet, the electric motor may be employed to drive the pump.

Having thus fully described my invention what I claim as new and desire to secure by Letters Patent is:

1. In a pumping device adapted to be driven at will either by the wind or by an electric driving motor, a pump jack having a drive shaft, means for driving said shaft, a pump rod casing provided with a collar on said casing, an electric driving motor provided with means whereby said motor may be energized or deenergized, an auxiliary drive gear for said pump jack shaft adapted to be driven by said electric motor, clutch means for engaging the drive gear and the shaft in power transmitting relationship, a linkage between said collar and said clutch, normally spaced ring connectors adapted upon movement to energize or de-energize said electric driving motor, said ring connectors being capable of movement to energizing and de-energizing positions by movement of said collar, and means for reciprocating said collar to energize or de-energize said electric driving motor.

2. The apparatus as described in claim 1, wherein said last-named means embodies a manually operable pull rod, and links and levers connecting said pull rod to said collar.

RALPH T. BEASLEY.

REFERENCES CITED

The following references are of record in the file of this patent:

UNITED STATES PATENTS

| Number | Name | Date |
| --- | --- | --- |
| Re. 20,603 | Gates | Dec. 28, 1937 |
| 633,879 | Miller | Sept. 26, 1899 |
| 2,172,915 | Vater | Sept. 12, 1939 |
| 2,257,660 | Tilsy | Sept. 30, 1941 |
| 2,276,993 | Marti | Mar. 17, 1942 |